Dec. 25, 1956 J. F. SNEED 2,775,056
FISHING FLOAT ASSEMBLY
Filed Feb. 21, 1956 2 Sheets-Sheet 1

INVENTOR.
JOSEPH F. SNEED,
BY
McMorrow, Berman & Davidson
ATTORNEYS.

Dec. 25, 1956 J. F. SNEED 2,775,056
FISHING FLOAT ASSEMBLY
Filed Feb. 21, 1956 2 Sheets-Sheet 2

INVENTOR.
JOSEPH F. SNEED,
BY
McMorrow, Berman + Davidson
ATTORNEYS.

United States Patent Office 2,775,056
Patented Dec. 25, 1956

2,775,056

FISHING FLOAT ASSEMBLY

Joseph F. Sneed, Sunflower, Kans.

Application February 21, 1956, Serial No. 566,954

4 Claims. (Cl. 43—43.11)

This invention relates generally to fishing equipment, and is more particularly concerned with a novel fishing float or the like which facilitates the casting of a fish line enabling the user of the same to dispose the fishhook at a predetermined distance below the float or bobber.

A primary object of invention in conformance with that set forth is to provide a novel fishing float which includes a hollow body member having an intermediate portion of the fish line extending longitudinally therethrough, said body member including adjustable anchor means for retaining the bobber in a relatively fixed adjusted position on the line, said body member having secured on an external portion thereof an intermediate spool portion upon which a predetermined length of fish line may be wound and including a pivotal fish line support plate over which an intermediate loop portion of the fish line may be suspended, the fish line support plate being in engagement with trigger means carried on the body member of the novel float, and said body member including within the same a sealed float member of sufficient capacity to cause the body member to float, the interior of the body member being in communication with the body of water in which the float will be used and capable of being filled with water for causing the float to move within the body member and engage the trigger means permitting the fish line support plate to rotate and dispense the line disposed on the bobber portion of the body member.

A further object of invention in conformance with that set forth is to provide a novel fishing float of the character set forth, a novel anchor means for retaining the fishing float in a fixed position on the fish line.

Another object of invention in conformance with that set forth is to provide a novel fishing float of the character set forth which is readily and economically manufactured, easily used, and highly satisfactory and efficient for the purpose intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2:
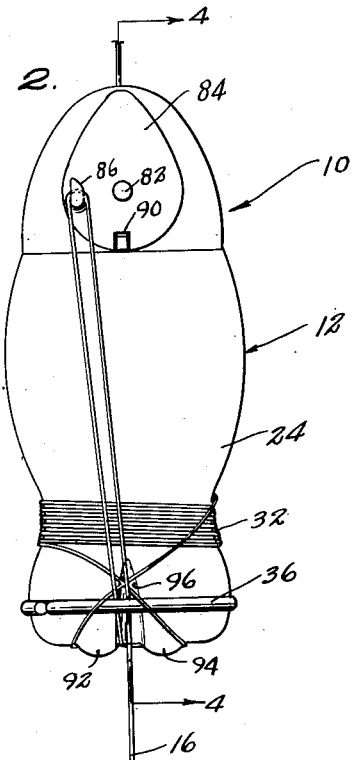
Figure 2 is a side elevational view of the novel float looking from right to left in Figure 1, showing the manner of rigging the fish line thereon.
Figure 3:
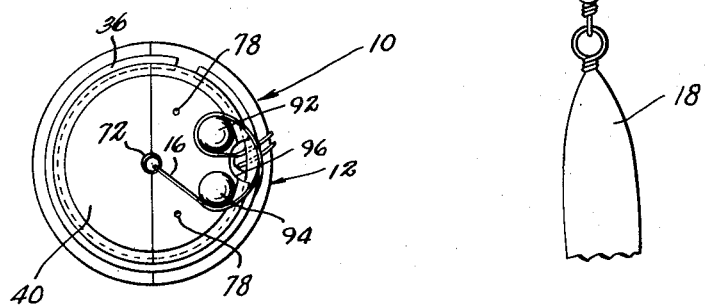
Figure 3 is a bottom plan view of the novel fishing float.

Referring to the drawings, the novel fishing float is indicated generally at 10 including a body member 12 which is generally disposed in a vertical position in a body of water 14, said body member 12 being elongated and having extending longitudinally therethrough a fish line 16 which will include a suitable sinker member 18 secured on a lower end portion thereof, see Figure 2.

The body member 12 is hollow including an interior chamber portion 20, the body member 12 may conveniently be constructed from two mating-shell portions 22 and 24 each of which having a peripheral mating lower groove portion 26 and 28 which define a spool portion indicated generally at 30 which will have disposed thereabout a plurality of convolutions 32 of the fish line 16 which will constitute a predetermined length of fish line for the purpose of disposing the fishhook (not shown) a predetermined distance below the novel fishing float. Extending about the outer periphery of the body member portions 22 and 24 are annular semicircular grooves which are in alignment and define a circumferential annular lock ring groove 34 for receiving therein a suitable lock ring 36 for retaining the portions 22 and 24 in mating engagement.

The body 12 includes upper and lower end portions 38 and 40, respectively, fromed by the mating shell sections 22 and 24, said end portions having extending therethrough transverse bore portions 42 and 44, respectively, formed by mating grooves in the mating portions of the shell portions 22 and 24 for receiving therethrough the fish line 16. The end portion 38 has mounted therein anchoring means 46 for retaining the novel float in a fixed adjusted position on an intermediate portion of the fish line.

Figure 5:
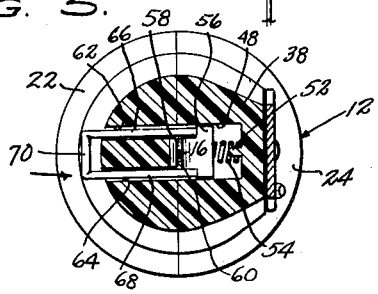
Figure 5 is a horizontal sectional view taken substantially on line 5—5 of Figure 4.

The anchoring means 46 comprises a transversely extending slot portion 48 extending in intersecting relationship relative to the bore portion 42, and including therein an integral pin element 52, see Figure 5, having circumposed thereabout one end of a compression spring element 54, the other end of the compression spring element 54 is in engagement with a T-shaped reciprocable lock element 56 which includes an end portion 58 extending into the bore portion 42. Disposed opposite the end portion 58 integral with the upper end 38 of the body member is a projecting lug element 60 extending into the bore portion 42, the fish line 16 being clampingly engaged between the portions 58 and 60. The body portion 12 includes a pair of parallel bores 62 and 64 which are in alignment with the ends of element 56, and which reciprocably receive therein leg elements 66 and 68, respectively which are connected at their outer ends by means of a bight porton 70, thus by applying pressure in the direction shown by the direction arrow in Figure 5, the compression spring 54 is overcome and the line 16 may be adjusted or pulled through the body member 12.

Disposed within the interior chamber 20 of the body member 12 and secured between the shell portions 22 and 24 is a longitudinally extending tubular guide sleeve member 72 through which a fishing line 16 will extend. Slidably supported on the sleeve 72 is a sealed hollow float element 74 which includes a central bore portion 76 reciprocably received on said sleeve 72, said float 74 consituting means for actuating a trigger assembly to subsequently be described. The bottom portion 40 of the body member includes extending transversely therethrough a plurality of apertured portions 78 for permitting water to enter into the interior chamber 20 of the float.

On the upper side portion the upper end portion 38 of the body member is a flattened portion 80 which has extending transversely therethrough a pivot pin element 82 receiving thereon a fish line support plate 84 which is rotatably or pivotally supported on said pivot pin and extending integrally from an outer surface portion of the plate 84 in laterally spaced relationship from the central or pivot axis portion thereof i. e. the portion through which the pivot pin element 82 extends, is a fish line engaging lug element 86 which forms an upwardly opening notch 88 through which the fish line will extend in a manner to subsequently become apparent. Plate 84 includes in a lower portion thereof a downwardly opening notch portion 90 which is operative to retain the fish line support plate 84 in a relatively fixed position on the body member in a manner to subsequently become apparent.

Depending from the bottom portion 40 of the body member 12 are a pair of spaced abutment elements 92 and 94 which aid in rigging the fish line on the novel float as will be described. Thus the line 16 extends through the body member 12 and as seen in Figure 2 is first wrapped around or extends around the abutment element 94 and thence is wound about a spool portion 30 of the body member for defining the convolutions 32, after which the fish line then extends about the portion 92, and continues upwardly through a notch portion 96 disposed longitudinally in the lower outer periphery of the body member 12, see Figure 2, after which the line 16 is looped about the lug element 86 in the notch portion 88 thereof and continues back through the notch portion 96 and is disposed in hanging relationship as seen in Figure 2.

Figure 8:
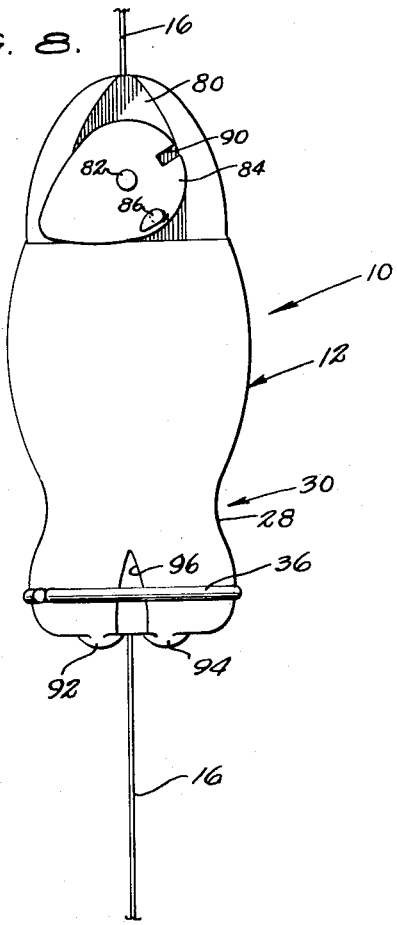
Figure 8 is a side elevational view similar to Figure 2 showing the novel fishing float after the line which was wound thereon has been dispensed.

In the absence of other structure being present, the lever arm resulting from the lateral disposition of the lug element 86 from the central pivot portion 82 of the fish line support plate 84, would rotate in a counterclockwise direction as seen in Figure 8, however, trigger mechanism indicated at 98 is provided to prevent the pivotal movement shown in Figure 8 until the interior chamber 20 of the body member 12 has been filled with water whereupon the float member 74 will be operative to actuate the trigger mechanism 98 as will now be described.

Figure 1:
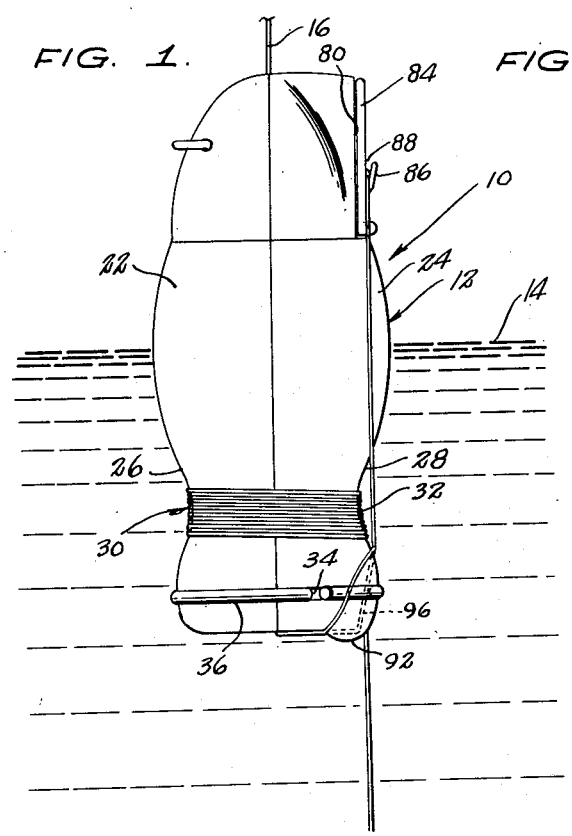
Figure 1 is a side elevational view of the novel fishing float.
Figure 4:
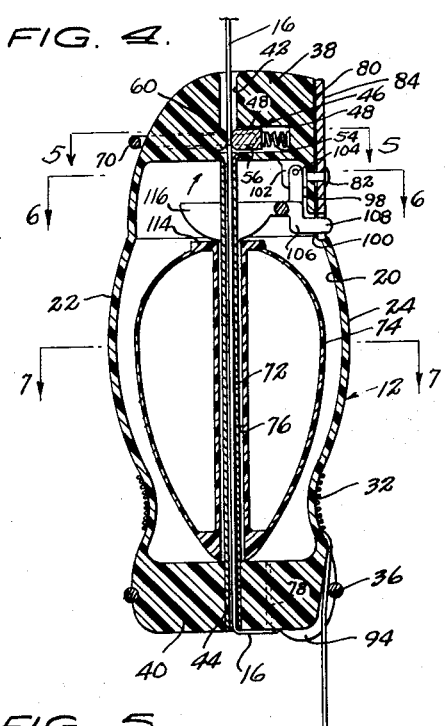
Figure 4 is a vertical sectional view taken substantially on line 4—4 of Figure 2.
Figure 6:
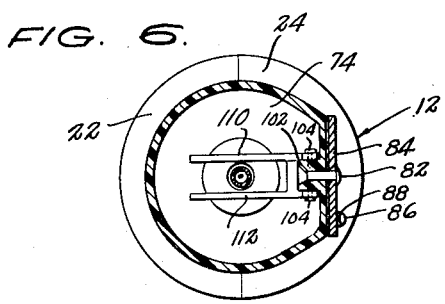
Figure 6 is a horizontal sectional view taken substantially on line 6—6 of Figure 4.
Figure 7:
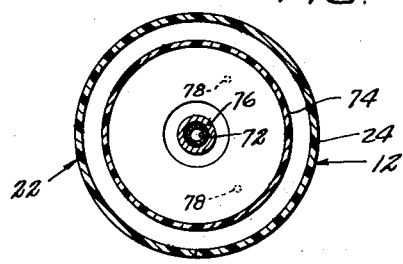
Figure 7 is a horizontal sectional view taken substantially on line 7—7 of Figure 4.

The body member 12 includes in portion 24 thereof an aperture 100 which will be in alignment with the notch portion 90 of the fish line support plate 84. As seen in Figures 4 and 6, the upper end 38 of the body member 12 has depending therefrom a mounting lug element 102 through which extends a transverse pivot pin 104, said transverse pivot pin means 104 comprising a pair of oppositely disposed pin elements which pivotally support an L-shaped lever element 106 having an end portion 108 extending through the aperture 100 and the notch 90 of the fish line support plate. When the end portion 108 is extended through the aperture 100 and the notch portion 90 of the support plate 84 said plate 84 will be retained in the position shown in Figures 1 and 2, for example. However, when the end portion 108 moves inwardly within the body member 12, the weight of the sinker 18 on the fish line will be sufficient to cause the plate 84 to pivot into the position shown in Figure 8 whereupon the previously rigged fish line will be dispensed from the spool portion 30 of the body member 12.

The lever 106 includes integral therewith a pair of transverse mutually parallel lever portions 110 and 112 which overlie the upper end 114 of the float member 74, said portions 110 and 112 including a lower arcuate surface 116 engageable by the portion 114, and thus upward movement of the float 74 due to water entering the aperture 78 and passing out of the aperture 100 of the body member results in said float member moving upwardly in the direction indicated by the direction arrow of Figure 4 pivoting the levers 110 and 112 in a counterclockwise direction about the pivot means 104 wherein the end portion 108 of the lever 106 moves away from the notch portion 90 of the plate 84.

Thus there has been disclosed a novel fishing float which fully conforms with the objects of invention heretofore set forth.

Various positional directional terms such as "upper," "lower," etc. utilized herein to have only a relative connotation to aid in describing the device and it is not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed is:

1. A fishing float or the like for use with a fish line having a sinker member thereon, comprising an elongated hollow body member, longitudinally aligned passage portions extending through opposite ends of the body member, anchor means on the body member engageable with an intermediate portion of a fish line extending therethrough for adjustably retaining the body member on said line, said body member including an annular spool portion for receiving a predetermined convoluted length of fish line thereabout, a line-support member pivotally supported on a transverse pivot axis portion on the body member, said line-support member including a lug element off-set from the transverse pivot axis portion for receiving an intermediate loop portion of the fish line thereover, trigger means carried on the body member in engagement with the fish line-support plate member for retaining the plate member in a fixed position preventing the line from being dispensed off the spool portion of the body member, and sealed float means contained in the body member and engageable with the trigger means permitting the line-support plate to pivot due to the force applied by the sinker member on the fish line and allowing the line on the spool portion of the body member to be dispensed, there being aperture means in the body member permitting the interior thereof to be filled with water for actuating the float means.

2. A fishing float or the like for use with a fish line having a sinker member thereon, comprising an elongated hollow body member, longitudinally aligned passage portions extending through opposite ends of the body member, anchor means on the body member engageable with an intermediate portion of a fish line extending therethrough for adjustably retaining the body member on said line, said body member including an annular spool portion for receiving a predetermined convoluted length of fish line thereabout, a line-support member pivotally supported on a transverse pivot axis portion on the body member, said line-support member including a lug element off-set from the transverse pivot axis portion for receiving an intermediate loop portion of the fish line thereover, trigger means carried on the body member in engagement with the fish line-support plate member for retaining the plate member in a fixed position preventing the line from being dispensed off the spool portion of the body member, and sealed float means contained in the body member and engageable with the trigger means permitting the line-support plate to pivot due to the force applied by the sinker member on the fish line and allowing the line on the spool portion of the body member to be dispensed, there being aperture means in the body member permitting the interior thereof to be filled with water for actuating the float means, said body member comprising two mating half-shell portions, a tubular sleeve member extending longitudinally between the mating half-shell portions for receiving the fish line therethrough, the sealed float means including a central bore portion reciprocably received on the tubular sleeve member.

3. A fishing float or the like for use with a fish line having a sinker member thereon, comprising an elongated hollow body member, longitudinally aligned passage portions extending through opposite ends of the body member, anchor means on the body member engageable with an intermediate portion of a fish line extending therethrough for adjustably retaining the body member on said line, said body member including an annular spool portion for receiving a predetermined convoluted length of fish line thereabout, a line-support member pivotally supported on a transverse pivot axis portion on the body member, said line-support member including a lug element off-set from the transverse pivot axis portion for receiving an intermediate loop portion of the fish line thereover, trigger means carried on the body member in engagement with the fish line-support plate member for retaining the plate member in a fixed position preventing the line from being dispensed off the spool portion of the body member, and sealed float means contained in the body member and engageable with the trigger means permitting the line-support plate to pivot due to the force applied by the sinker member on the fish line and allowing the line on the spool portion of the body member to be dispensed, there being aperture means in the body member permitting the interior thereof to be filled with water for actuating the float means, said anchor means including a transverse slot portion within the body member in intersecting relationship with one of the longitudinal bore portions therein, a spring-urged latch element disposed in the slot portion and extending into intersecting relationship with the one longitudinal bore portion, and force transmitting means on the body member in engagement with the spring-urged latch element for moving the latch element away from the fish line disposed in the longitudinal bore portion for adjusting the relative position of the body member with respect to said fish line.

4. A fishing float or the like for use with a fish line having a sinker member thereon, comprising an elongated hollow body member, longitudinally aligned passage portions extending through opposite ends of the body member, anchor means on the body member engageable with an intermediate portion of a fish line extending therethrough for adjustably retaining the body member on said line, said body member including an annular spool portion for receiving a predetermined convoluted length of fish line thereabout, a line-support member pivotally supported on a transverse pivot axis portion on the body member, said line-support member including a lug element off-set from the transverse pivot axis portion for receiving an intermediate loop portion of the fish line thereover, trigger means carried on the body member in engagement with the fish line-support plate member for retaining the plate member in a fixed position preventing the line from being dispensed off the spool portion of the body member, and sealed float means contained in the body member and engageable with the trigger means permitting the line-support plate to pivot due to the force applied by the sinker member on the fish line and allowing the line on the spool portion of the body member to be dispensed, there being aperture means in the body member permitting the interior thereof to be filled with water for actuating the float means, the fish line support plate including a lower abutment portion, the body member including an aperture portion therein in alignment with the abutment portion, a lever element pivotally supported in the body member and including an end portion extendable through the aperture portion of the body member and engageable with the abutment portion, said lever element including an extension portion extending in overlying relationship relative to the float member for pivotally rotating the lever within the body member when engaged by the float member.

No references cited.